United States Patent
Iijima (10) Patent No.: US 11,358,836 B2
(45) Date of Patent: Jun. 14, 2022

(54) WIRE ROPE INSPECTION DEVICE, WIRE ROPE INSPECTION SYSTEM, AND WIRE ROPE INSPECTION METHOD

(71) Applicant: SHIMADZU CORPORATION, Kyoto (JP)

(72) Inventor: Kenji Iijima, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 68 days.

(21) Appl. No.: 16/959,592

(22) PCT Filed: Feb. 1, 2018

(86) PCT No.: PCT/JP2018/003469
§ 371 (c)(1),
(2) Date: Jul. 1, 2020

(87) PCT Pub. No.: WO2019/150539
PCT Pub. Date: Aug. 8, 2019

(65) Prior Publication Data
US 2021/0380372 A1    Dec. 9, 2021

(51) Int. Cl.
*B66B 7/12* (2006.01)
*G01N 27/87* (2006.01)

(52) U.S. Cl.
CPC .............. *B66B 7/123* (2013.01); *G01N 27/87* (2013.01)

(58) Field of Classification Search
CPC ......... B66B 7/123; B66C 15/00; B66C 23/88; B66D 1/54; G01N 27/83
See application file for complete search history.

(56) References Cited

U.S. PATENT DOCUMENTS

| | | | |
|---|---|---|---|
| 2017/0023347 A1* | 1/2017 | Ouellette | G01N 27/9006 |
| 2017/0038338 A1* | 2/2017 | Kondoh | G01N 27/83 |
| 2019/0079053 A1* | 3/2019 | Hirota | G01N 27/83 |

FOREIGN PATENT DOCUMENTS

| | | |
|---|---|---|
| JP | 9-210968 A | 8/1997 |
| JP | 2001153845 A | 6/2001 |
| JP | 2002-116187 A | 4/2002 |
| JP | 2008-26126 A | 2/2008 |
| JP | 2011-203092 A | 10/2011 |
| JP | 5044545 B2 | 10/2012 |

OTHER PUBLICATIONS

Extended European Search Report dated Jul. 30, 2021, issued by the European Patent Office in application No. 18903186.7.
International Search Report for PCT/JP2018/003469 dated, Apr. 3, 2018 (PCT/SA/210).
Written Opinion of the International Searching Authority for PCT/JP2018/003469 dated, Apr. 3, 2018 (PCT/ISA/237).
Communication dated Jul. 1, 2021, from the Korean Intellectual Property Office in application No. 10-2020-7017754.

* cited by examiner

*Primary Examiner* — Christopher P McAndrew
*Assistant Examiner* — Zannatul Ferdous
(74) *Attorney, Agent, or Firm* — Sughrue Mion, PLLC (57) ABSTRACT

A wire rope inspection device (100) includes a controller 21 configured or programmed to detect a state of a wire rope (W) based on a difference at substantially a same position between a first detection signal acquired by a differential coil (10) in a first measurement and a second detection signal acquired by the differential coil in a second measurement after the first measurement.

9 Claims, 5 Drawing Sheets

WIRE ROPE INSPECTION DEVICE, WIRE ROPE INSPECTION SYSTEM, AND WIRE ROPE INSPECTION METHOD

CROSS REFERENCE TO RELATED APPLICATIONS

This application is a National Stage of International Application No. PCT/JP2018/003469 filed Feb. 1, 2018.

TECHNICAL FIELD

The present invention relates to a wire rope inspection device, a wire rope inspection system, and a wire rope inspection method.

BACKGROUND ART

Conventionally, a wire rope inspection device is known. Such a wire rope inspection device is disclosed in Japanese Patent No. 5044545, for example.

Japanese Patent No. 5044545 discloses a wire rope monitoring system (wire rope inspection device) including a detection coil that detects the leakage magnetic flux of a wire rope, and a controller that detects the state of the wire rope based on a detection signal acquired by the detection coil.

PRIOR ART

Patent Document

Patent Document 1: Japanese Patent No. 5044545

SUMMARY OF THE INVENTION

Problem to be Solved by the Invention

However, in the wire rope monitoring system (wire rope inspection device) described in Japanese Patent No. 5044545, even in a portion of the wire rope without any damage, a change in the leakage magnetic flux is disadvantageously detected as noise data (noise) by the detection coil. Consequently, there is a problem that it is difficult to accurately detect the damage of the wire rope under the influence of the noise data.

The present invention is intended to solve the above problem. The present invention aims to provide a wire rope inspection device, a wire rope inspection system, and a wire rope inspection method capable of accurately detecting the damage of a wire rope.

Means for Solving the Problem

In order to attain the aforementioned object, as a result of earnest studies, the inventor has newly found that a wire rope has an intrinsic magnetic property. Furthermore, the inventor has found that the wire rope has the intrinsic magnetic property such that the output at each position in the longitudinal direction of the wire rope is substantially the same (measured with good reproducibility) every time a wire rope inspection device that detects a change in the magnetic field of the wire rope performs a measurement. That is, the inventor has found that the output that has been conventionally regarded as mere noise data (noise) other than the output at a damaged portion when the wire rope is damaged before and after the measurement is an intrinsic value that can be measured with good reproducibility. The inventor has also found that the output of the wire rope inspection device based on the intrinsic magnetic property of the wire rope changes depending on a difference in the uniformity of twist at a cross-sectional position orthogonal to the longitudinal direction of the wire rope or a difference in the uniformity of the amount of steel material at the cross-sectional position orthogonal to the longitudinal direction of the wire rope, for example.

A wire rope inspection device according to a first aspect of the present invention includes a magnetic field application unit configured to adjust a magnitude and a direction of magnetization of a wire rope, which is a magnetic body, by applying a magnetic field to the wire rope in advance, a detection coil including a first receiving coil and a second receiving coil, the detection coil being configured to detect a change in the magnetic field of the wire rope based on a difference between a detection voltage that changes with a magnetic flux that passes through the first receiving coil and a detection voltage that changes with a magnetic flux that passes through the second receiving coil, and a controller configured or programmed to detect a state of the wire rope based on a difference at substantially a same position between a first detection signal acquired by the detection coil in a first measurement and a second detection signal acquired by the detection coil in a second measurement after the first measurement.

Based on the above findings, the wire rope inspection device according to the first aspect of the present invention is configured as described above such that based on the difference at substantially the same position between the first detection signal obtained by the first measurement and the second detection signal obtained by the second measurement in which substantially the same output as that in the first measurement is obtained, except for the outputs of damaged portions of the wire rope generated after the first measurement, the noise data of the wire rope can be canceled, and thus it is possible to detect the damage of the wire rope generated after the first measurement without being affected by the noise data (a change in an intrinsic magnetic property) of the wire rope. Consequently, in an output waveform based on the detection signal, the output is made sharp such that the damaged portions and non-damaged portions of the wire rope can be more clearly distinguished, and thus the damage of the wire rope can be detected accurately. That is, due to the difference, the amount of change in the outputs of the damaged portions of the wire rope can be relatively increased, and the amount of change in the outputs of the non-damaged portions can be relatively reduced in the output waveform, and thus the damage of the wire rope can be detected accurately.

In the aforementioned wire rope inspection device according to the first aspect, the detection coil is preferably configured to detect a change in an intrinsic magnetic property of the wire rope, and the controller is preferably configured or programmed to acquire the difference between the first detection signal and the second detection signal at substantially the same position, and cancel an output based on the change in the intrinsic magnetic property of the wire rope. Accordingly, the output based on the change in the intrinsic magnetic property of the wire rope is canceled such that the damage of the wire rope can be accurately detected.

The aforementioned wire rope inspection device according to the first aspect preferably further includes a magnetic field application unit configured to adjust a direction of magnetization of the wire rope by applying a magnetic field to the wire rope in a direction that intersects with a direction in which the wire rope extends. Accordingly, a magnetic field is applied to the wire rope in advance by the magnetic field application unit such that the magnetization of a portion of the wire rope without any damage or the like can be adjusted, and thus the reproducibility of the output for each measurement by the wire rope inspection device can be further improved. Consequently, a change in the intrinsic magnetic property of the wire rope can be more reliably canceled based on the difference. That is, the influence of the noise data can be further reduced, and the damage of the wire rope can be detected.

The aforementioned wire rope inspection device according to the first aspect preferably further includes a storage configured to store detection information in which each of the first detection signal and the second detection signal is associated with positional information of the wire rope, and the controller is preferably configured or programmed to acquire the detection information from the storage, to substantially align, with each other, positions at which the wire rope is detected in the first measurement and the second measurement, and to acquire the difference between the first detection signal and the second detection signal. Accordingly, with the storage configured to store the detection information, the difference between the first detection signal and the second detection signal at substantially the same position can be easily acquired.

In the aforementioned wire rope inspection device according to the first aspect, the controller is preferably configured or programmed to perform at least one of a correction of a sensitivity of the detection coil and a correction of a position at which the wire rope is detected with respect to the first detection signal or the second detection signal, and then acquire the difference between the first detection signal and the second detection signal. Accordingly, even when the first measurement and the second measurement are performed in different temperature environments, for example, the sensitivity range of the detection coil at the time of the first measurement can be matched with the sensitivity range of the detection coil at the time of the second measurement by the sensitivity correction. Therefore, the amount of change in the output acquired based on the difference between the first detection signal and the second detection signal can be further reduced. In addition, even when the first measurement and the second measurement are performed at positions in the wire rope deviated from each other, the influence of the positional deviation can be significantly reduced or prevented by the position correction. Therefore, the amount of change in the output acquired based on the difference between the first detection signal and the second detection signal can be further reduced. Thus, the damage of the wire rope can be more accurately detected.

A wire rope inspection system according to a second aspect of the present invention includes an inspection device including a magnetic field application unit configured to adjust a magnitude and a direction of magnetization of a wire rope, which is a magnetic body, by applying a magnetic field to the wire rope in advance, and a detection coil including a first receiving coil and a second receiving coil, the detection coil being configured to detect a change in the magnetic field of the wire rope based on a difference between a detection voltage that changes with a magnetic flux that passes through the first receiving coil and a detection voltage that changes with a magnetic flux that passes through the second receiving coil, and a control device configured or programmed to detect a state of the wire rope based on a difference at substantially a same position between a first detection signal acquired by the detection coil in a first measurement and a second detection signal acquired by the detection coil in a second measurement after the first measurement.

The wire rope inspection system according to the second aspect of the present invention is configured as described above such that based on the difference at substantially the same position between the first detection signal obtained by the first measurement and the second detection signal obtained by the second measurement in which substantially the same output as that in the first measurement is obtained, except for the outputs of damaged portions of the wire rope generated after the first measurement, the noise data of the wire rope can be canceled, and thus it is possible to detect the damage of the wire rope generated after the first measurement without being affected by the noise data (a change in an intrinsic magnetic property) of the wire rope. Consequently, in an output waveform based on the detection signal, the output is made sharp such that the damaged portions and non-damaged portions of the wire rope can be more clearly distinguished, and thus it is possible to provide the wire rope inspection system capable of accurately detecting the damage of the wire rope. That is, due to the difference, the amount of change in the outputs of the damaged portions of the wire rope can be relatively increased, and the amount of change in the outputs of the non-damaged portions can be relatively reduced in the output waveform, and thus it is possible to provide the wire rope inspection system capable of accurately detecting the damage of the wire rope.

In the aforementioned wire rope inspection system according to the second aspect, the inspection device is preferably configured to detect a change in an intrinsic magnetic property of the wire rope by the detection coil, and the control device is preferably configured or programmed to acquire the difference between the first detection signal and the second detection signal at substantially the same position, and cancel an output based on the change in the intrinsic magnetic property of the wire rope. Accordingly, it is possible to provide the wire rope inspection system capable of accurately detecting the damage of the wire rope by canceling the output based on the change in the intrinsic magnetic property of the wire rope.

A wire rope inspection method according to a third aspect of the present invention includes adjusting a magnitude and a direction of magnetization of a wire rope, which is a magnetic body, by applying a magnetic field to the wire rope in advance by a magnetic field application unit, performing a first measurement for detecting a change in the magnetic field of the wire rope based on a difference between a detection voltage that changes with a magnetic flux that passes through a first receiving coil and a detection voltage that changes with a magnetic flux that passes through a second receiving coil and acquiring a first detection signal by a detection coil including the first receiving coil and the second receiving coil, performing a second measurement for detecting the change in the magnetic field of the wire rope based on the difference between the detection voltage that changes with the magnetic flux that passes through the first receiving coil and the detection voltage that changes with the magnetic flux that passes through the second receiving coil and acquiring a second detection signal by the detection coil after the first measurement, and detecting a state of the wire rope based on a difference between the first detection signal and the second detection signal at substantially a same position.

The wire rope inspection method according to the third aspect of the present invention is configured as described above such that based on the difference at substantially the same position between the first detection signal obtained by the first measurement and the second detection signal obtained by the second measurement in which substantially the same output as that in the first measurement is obtained, except for the outputs of damaged portions of the wire rope generated after the first measurement, the noise data of the wire rope can be canceled, and thus it is possible to detect the damage of the wire rope generated after the first measurement without being affected by the noise data (a change in an intrinsic magnetic property) of the wire rope. Consequently, in an output waveform based on the detection signal, the output is made sharp such that the damaged portions and non-damaged portions of the wire rope can be more clearly distinguished, and thus it is possible to provide the wire rope inspection method capable of accurately detecting the damage of the wire rope. That is, due to the difference, the amount of change in the outputs of the damaged portions of the wire rope can be relatively increased, and the amount of change in the outputs of the non-damaged portions can be relatively reduced in the output waveform, and thus it is possible to provide the wire rope inspection method capable of accurately detecting the damage of the wire rope.

In the aforementioned wire rope inspection method according to the third aspect, the detecting the state of the wire rope preferably includes acquiring the difference between the first detection signal and the second detection signal at substantially the same position, and canceling an output based on a change in an intrinsic magnetic property of the wire rope. Accordingly, it is possible to provide the wire rope inspection method capable of accurately detecting the damage of the wire rope by canceling the output based on the change in the intrinsic magnetic property of the wire rope.

Effect of the Invention

According to the present invention, as described above, the damage of the wire rope can be accurately detected.

MODES FOR CARRYING OUT THE INVENTION

Embodiments embodying the present invention are hereinafter described on the basis of the drawings.

First Embodiment

The configuration of a wire rope inspection device 100 according to a first embodiment is now described with reference to FIGS. 1 to 6.
(Configuration of Wire Rope Inspection Device)

Figure 1:
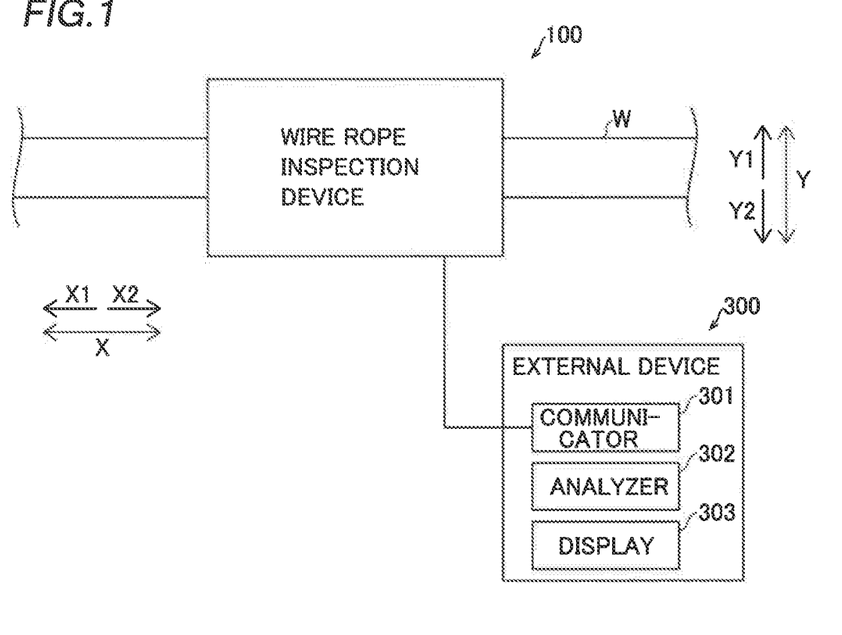
FIG. 1 is a schematic view showing the configuration of a wire rope inspection device according to a first embodiment.

As shown in FIG. 1, the wire rope inspection device 100 is configured to inspect a wire rope W to be inspected.

The wire rope inspection device 100 is configured to periodically inspect the wire rope W. The wire rope inspection device 100 is configured to inspect the damage of the wire rope W.

The term "damage of the wire rope W" indicates a wider concept including portions in which a cross-sectional area change in a detection direction occurs due to rubbing, local wear, wire breakage, a dent, corrosion, a crack, breakage, etc. (including one due to a void when a flaw or the like occurs inside the wire rope W), portions in which a permeability change occurs due to rust of the wire rope W, welding burn of the wire rope W, mixing of impurities into the wire rope W, composition change of the wire rope W, etc., and other non-uniform portions of the wire rope W.

Figure 2:
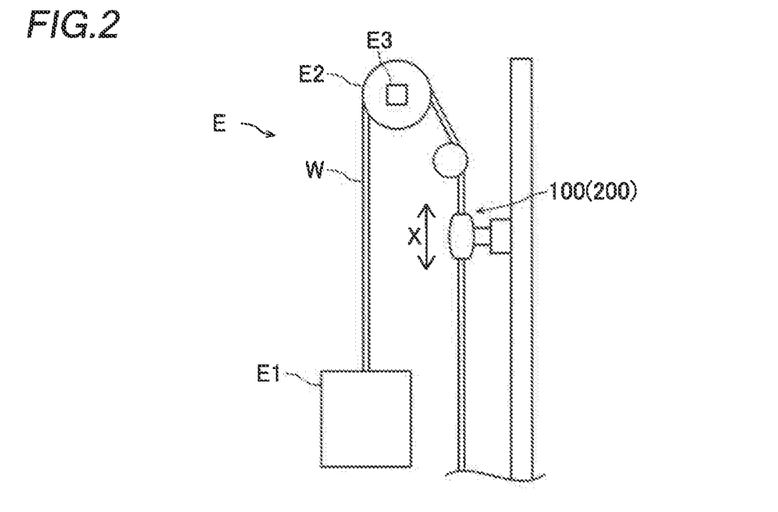
FIG. 2 is a schematic view showing an elevator using a wire rope inspected by the wire rope inspection device according to the first embodiment.

As shown in FIG. 2, the wire rope inspection device 100 inspects the wire rope W while relatively moving along a surface of the wire rope W to be inspected. The wire rope W is used in an elevator E. The elevator E includes a car E1, a hoist E2 that hoists the wire rope W to raise and lower the car E1, and a position sensor E3 that detects the position of the car E1 (wire rope W). In the elevator E, the wire rope W is moved by the hoist E2, and thus inspection is performed with the movement of the wire rope W in a state in which the wire rope inspection device 100 is fixed. The wire rope W is arranged so as to extend in an X direction at the position of the wire rope inspection device 100.

Figure 3:
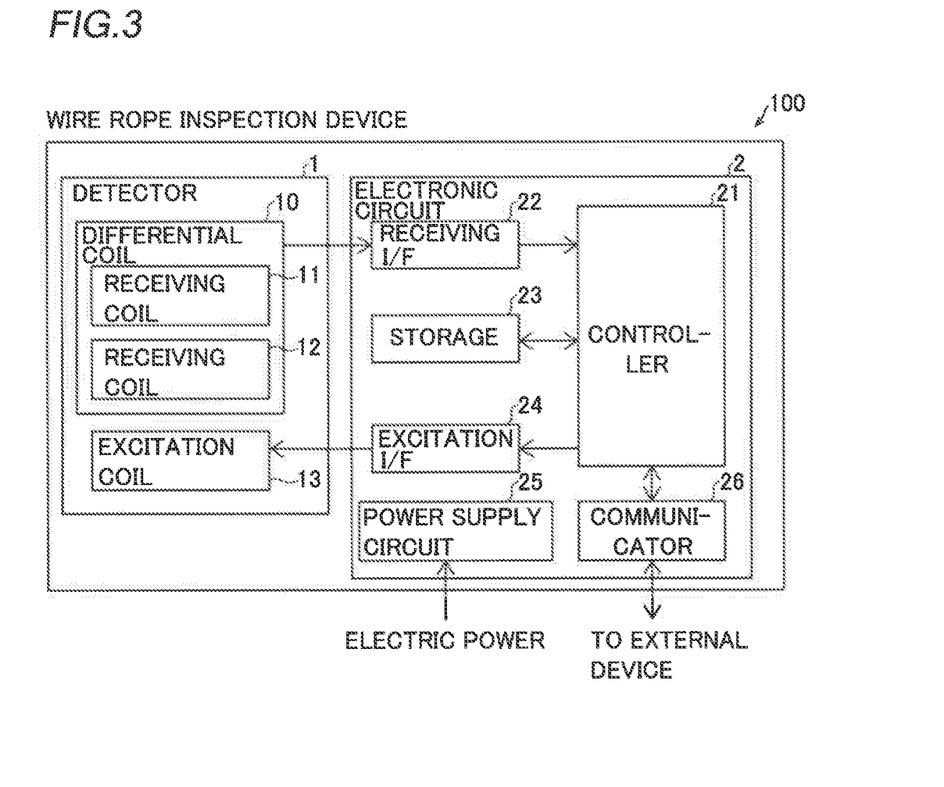
FIG. 3 is a block diagram showing the control configuration of the wire rope inspection device according to the first embodiment.

As shown in FIG. 3, the wire rope inspection device 100 includes a detector 1 and an electronic circuit 2. The detector 1 includes a differential coil 10 including a pair of receiving coils 11 and 12, and an excitation coil 13. The electronic circuit 2 includes a controller 21, a receiving I/F 22, a storage 23, an excitation I/F 24, a power supply circuit 25, and a communicator 26. The wire rope inspection device 100 further includes a magnetic field application unit 4 (see FIG. 4). The differential coil 10 is an example of a "detection coil" in the claims.

An external device 300 is connected to the wire rope inspection device 100 via the communicator 26.

As shown in FIG. 1, the external device 300 includes a communicator 301, an analyzer 302, and a display 303. The external device 300 is configured to receive measurement data of the wire rope W obtained by the wire rope inspection device 100 via the communicator 301. The external device 300 is configured to analyze the type of damage, such as a broken wire or a change in cross-sectional area, by the analyzer 302 based on the received measurement data of the wire rope W. The external device 300 is configured to display the analysis result on the display 303. Furthermore, the external device 300 is configured to make an abnormality determination based on the analysis result and display the result on the display 303.

Figure 4:
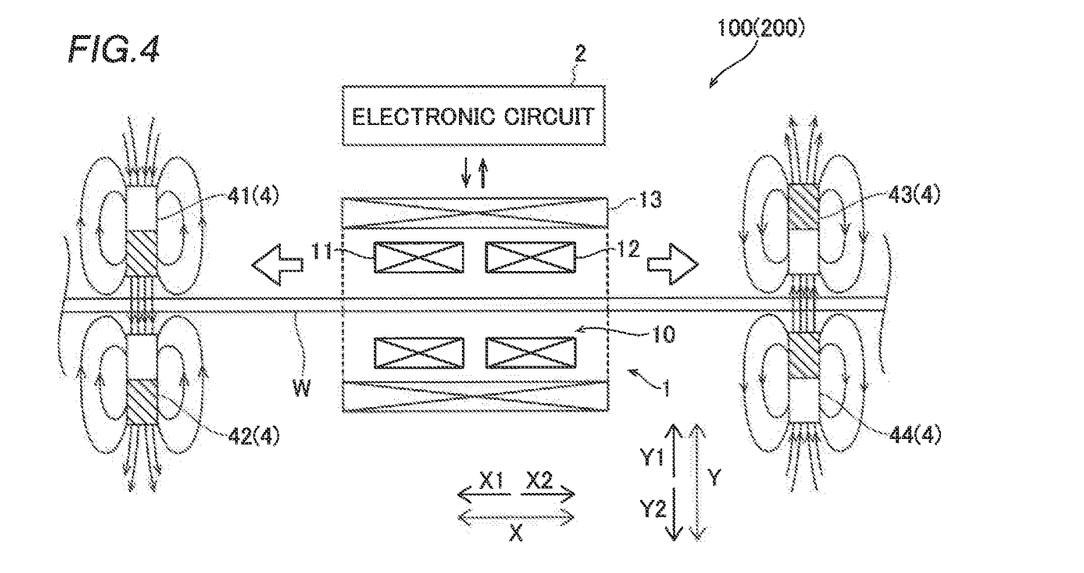
FIG. 4 is a diagram for illustrating the configuration of a magnetic field application unit and a detector of a magnetic body inspection device according to the first embodiment.

As shown in FIG. 4, the wire rope inspection device 100 is configured to detect a change in the magnetic field (magnetic flux) of the wire rope W by the differential coil 10. No DC magnetizer is arranged in the vicinity of the coil of the wire rope inspection device 100.

The term "change in the magnetic field" indicates a wider concept a temporal change in the strength of the magnetic field detected by the detector 1 due to relative movement of the wire rope W and the detector 1 and a temporal change in the strength of the magnetic field detected by the detector 1 due to a temporal change in a magnetic field applied to the wire rope W.

The wire rope inspection device 100 is configured to remove noise data (a change in an intrinsic magnetic property) included in detection signals of the wire rope W based on the detection signals (a first detection signal and a second detection signal described below, for example) obtained by measurement at two time points different from each other in time. The details are described below.

(Configuration and Characteristics of Wire Rope)

The wire rope W is formed by braiding (strand braiding, for example) a magnetic wire material. The wire rope W is a magnetic body made of a long material that extends in the X direction. The state (presence or absence of a flaw or the like) of the wire rope W is monitored to prevent the wire rope W from being cut due to deterioration. The wire rope W, the deterioration of which has progressed beyond a predetermined amount is replaced.

The wire rope W has an intrinsic magnetic property. The intrinsic magnetic property is a magnetic property that changes due to a difference in the uniformity of twist at a cross-sectional position orthogonal to the longitudinal direction (X direction) of the wire rope W or a difference in the uniformity of the amount of steel material at the cross-sectional position orthogonal to the longitudinal direction (X direction) of the wire rope W, for example. The uniformity of the twist of the wire rope W and the uniformity of the amount of steel material hardly change over time (or hardly change much over time). Therefore, the wire rope W has the intrinsic magnetic property such that the output at each position in the longitudinal direction (X direction) of the wire rope W is substantially the same (measured with good reproducibility) every time the wire rope inspection device 100 performs a measurement at time points different from each other in time.

Figure 5:
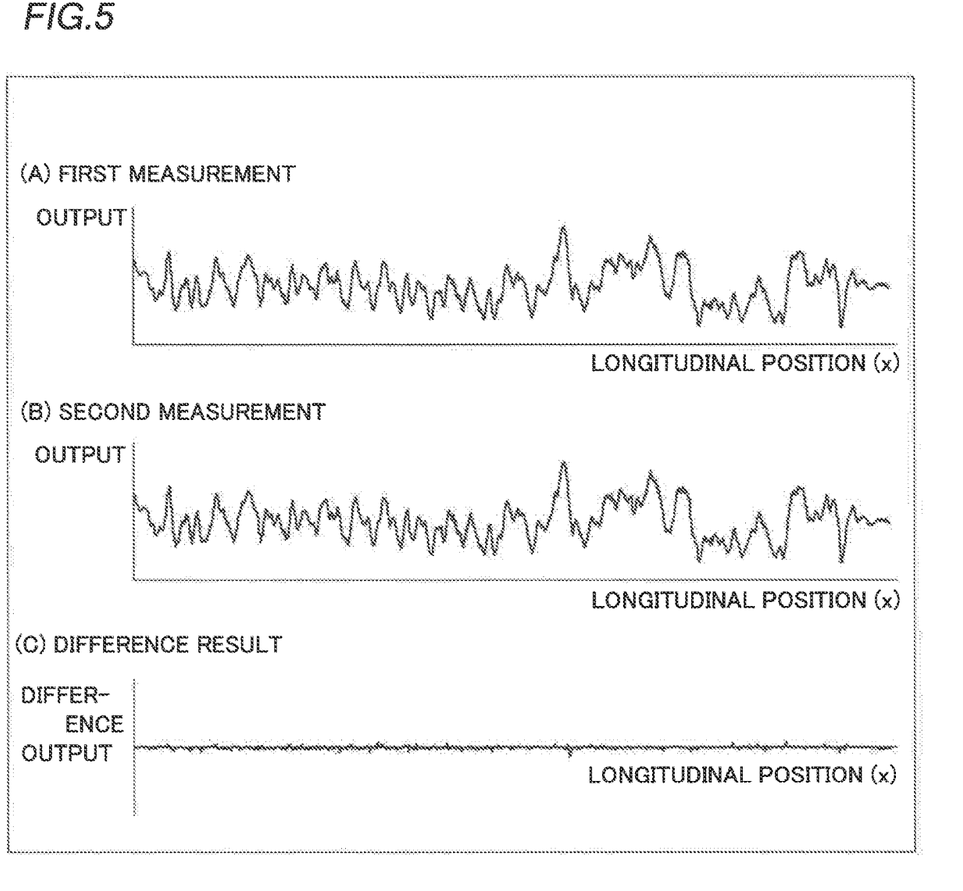
FIG. 5 is a diagram for illustrating the intrinsic magnetic property of the wire rope according to the first embodiment.

Specifically, the output at a predetermined position in the longitudinal direction of the wire rope W obtained by a first measurement performed by the wire rope inspection device 100, as shown in FIG. 5(A), and the output at a predetermined position in the longitudinal direction of the wire rope W obtained by a second measurement after the first measurement, as shown in FIG. 5(B), are substantially the same.

Therefore, when a difference at substantially the same position in the longitudinal direction (X direction) of the wire rope is acquired, an output waveform having a small amplitude as shown in FIG. 5(C), from which the intrinsic noise data has been removed, is obtained. In other words, the outputs based on changes in the intrinsic magnetic property of the wire rope W during the first measurement and the second measurement are canceled, and a relatively flat output waveform as shown in FIG. 5(C) is obtained. Such a result is similarly obtained regardless of whether a period between the first measurement and the second measurement is relatively short (several seconds, several minutes) or relatively long (several months, several years). It should be noted that the fact that the wire rope W has an intrinsic magnetic property is a finding found as a result of earnest studies by the inventor of the present invention.

(Configuration of Magnetic Field Application Unit)

As shown in FIG. 4, the magnetic field application unit 4 is configured to apply, in advance, a magnetic field to the wire rope W to be inspected in a Y direction (a direction that intersects with a direction in which the wire rope W extends) and adjust the magnitude and direction of the magnetization of the wire rope W, which is a magnetic body. The magnetic field application unit 4 includes a first magnetic field application unit including magnets 41 and 42 and a second magnetic field application unit including magnets 43 and 44. The first magnetic field application unit (magnets 41 and 42) is arranged on a first side (X1 direction side) in the direction in which the wire rope W extends with respect to the detector 1. The second magnetic field application unit (magnets 43 and 44) is arranged on a second side (X2 direction side) in the direction in which the wire rope W extends with respect to the detector 1.

The first magnetic field application unit (magnets 41 and 42) is configured to apply a magnetic field in a Y2 direction parallel to a plane that intersects with the direction in which the wire rope W extends (X direction). The second magnetic field application unit (magnets 43 and 44) are configured to apply a magnetic field in a Y1 direction parallel to a plane that intersects with the direction in which the wire rope W extends (X direction). That is, the magnetic field application unit 4 is configured to apply a magnetic field in a direction substantially orthogonal to the X direction, which is the longitudinal direction of the long material.

(Configuration of Detector)

As shown in FIG. 3, the differential coil 10 (receiving coils 11 and 12) and the excitation coil 13 are each wound a plurality of times along the longitudinal direction around the direction in which the wire rope W, which is a magnetic body made of a long material, extends as a central axis. Furthermore, the differential coil 10 and the excitation coil 13 are coils including conducting wire portions cylindrically formed along in the X direction (longitudinal direction) in which the wire rope W extends. Therefore, formation surfaces of the conducting wire portions around which the differential coil 10 and the excitation coil 13 are wound are substantially orthogonal to the longitudinal direction. The wire rope W passes through the insides of the differential coil 10 and the excitation coil 13. The differential coil 10 is provided inside the excitation coil 13. The arrangement of the differential coil 10 and the excitation coil 13 is not limited to this. The receiving coil 11 of the differential coil 10 is arranged on the X1 direction side. The receiving coil 12 of the differential coil 10 is arranged on the X2 direction side. The receiving coils 11 and 12 are arranged at an interval of about several mm to several cm.

The excitation coil 13 excites the magnetization state of the wire rope W. Specifically, an excitation alternating current flows through the excitation coil 13 such that a magnetic field generated based on the excitation alternating current inside the excitation coil 13 is applied along the X direction.

The differential coil 10 is configured to transmit a differential signal between the pair of receiving coils 11 and 12. Specifically, the differential coil 10 is configured to detect a change in the magnetic field of the wire rope W and transmit the differential signal. The differential coil 10 is configured to detect a change in the magnetic field in the X direction of the wire rope W to be inspected and output a detection signal (voltage). That is, the differential coil 10 detects a change in the magnetic field, in the X direction that intersects with the Y direction, of the wire rope W to which a magnetic field is applied in the Y direction by the magnetic field application unit 4. Furthermore, the differential coil 10 is configured to output a differential signal (voltage) based on the detected change in the magnetic field of the wire rope W in the X direction. The differential coil 10 is arranged such that substantially all of the magnetic field generated by the excitation coil 13 can be detected (input).

When a defect (flaw or the like) exists in the wire rope W, the total magnetic flux (a value obtained by multiplying the magnetic field by the magnetic permeability and the area) of the wire rope W is reduced in a portion with the defect (flaw or the like). Consequently, when the receiving coil 11 is located at the portion with the defect (flaw or the like), for example, the amount of magnetic flux that passes through the receiving coil 12 changes as compared with the receiving coil 11, and thus the absolute value (differential signal) of a difference between detection voltages detected by the differential coil 10 increases. On the other hand, the differential signal in a portion with no defect (flaw or the like) is substantially zero. Thus, the differential coil 10 detects a clear signal (a signal with a good S/N ratio) indicating the presence of a defect (flaw or the like). Accordingly, the electronic circuit 2 can detect the presence of a defect (flaw or the like) in the wire rope W based on the value of the differential signal.

(Configuration of Electronic Circuit)

The controller 21 of the electronic circuit 2 shown in FIG. 3 is configured or programmed to control each portion of the wire rope inspection device 100. Specifically, the controller 21 includes a processor such as a central processing unit (CPU), a memory, an AD converter, etc.

The controller 21 is configured or programmed to receive the differential signal of the differential coil 10 and detect the state of the wire rope W. The controller 21 is configured or programmed to perform a control to excite the excitation coil 13. The controller 21 is configured or programmed to transmit the detection result of the state of the wire rope W to the external device 300 via the communicator 26.

The receiving I/F 22 is configured to receive the differential signal from the differential coil 10 and transmit the differential signal to the controller 21. Specifically, the receiving I/F 22 includes an amplifier. Furthermore, the receiving I/F 22 is configured to amplify the differential signal of the differential coil 10 and transmit the amplified signal to the controller 21.

The excitation I/F 24 is configured to receive a signal from the controller 21 and control electric power supply to the excitation coil 13. Specifically, the excitation I/F 24 controls electric power supply from the power supply circuit 25 to the excitation coil 13 based on a control signal from the controller 21.

The controller 21 is configured or programmed to detect the state of the wire rope W based on a difference at substantially the same position between the first detection signal acquired by the differential coil 10 in the first measurement and the second detection signal acquired by the differential coil 10 in the second measurement after the first measurement. Specifically, the controller 21 is configured or programmed to acquire the difference between the first detection signal and the second detection signal at substantially the same position, and cancel the output based on a change in the intrinsic magnetic property of the wire rope W.

The controller 21 is configured or programmed to determine whether or not the wire rope W has a defect. The controller 21 has a function of determining the size of the defect (a flaw or the like) of the wire rope W. The controller 21 is configured or programmed to acquire the speed of relative movement of the wire rope W with respect to the detector 1. For example, the controller 21 may be configured or programmed to acquire the position of the elevator E from the position sensor E3. In addition, the wire rope inspection device 100 itself may include a position sensor (not shown) that detects the position of the wire rope W. The storage 23 is configured to store detection information in which the positional information of the wire rope W is associated with each of the first detection signal and the second detection signal by the controller 21.

The controller 21 is configured or programmed to acquire the detection information from the storage 23, to substantially align, with each other, positions at which the wire rope W is detected in the first measurement and the second measurement, and to acquire a difference between the first detection signal and the second detection signal. The storage 23 may include an HDD, an SSD, or the like.

The controller 21 is configured or programmed to correct the sensitivity of the differential coil 10 and the position at which the wire rope W is detected with respect to the second detection signal, and then acquire the difference between the first detection signal and the second detection signal. For example, output data y(x) is acquired from the difference between the first detection signal $f_0(x)$ and the second detection signal f(x) by the following formula.

$$\alpha \times f(x-\Delta x) - f_0(x) = y(x)$$

The above $\alpha$ represents a correction coefficient for the sensitivity of the differential coil 10, and $\alpha$ may be set to a predetermined value according to the environmental temperature at which the differential coil 10 is placed, for example. In addition, $\alpha$ may be a ratio obtained by comparing representative peaks in the output waveforms of the first detection signal and the second detection signal. The above $\Delta x$ represents a value for correcting the position of the wire rope W in the longitudinal direction (X direction), and $\Delta x$ may be the magnitude of the deviation of a detection position in the longitudinal direction (X direction) of the wire rope W obtained by comparing representative peaks in the output waveforms, for example. Furthermore, $\alpha$ and $\Delta x$ are set such that the variance of y(x) is minimized. The above $f_0(x)$ has an output waveform unique to each wire rope W in an initial state, for example. The unique output waveform is determined by a change in the magnetic permeability of a wire, a change in the density of the wire as the wire rope W, or a change in the wire diameter, for example, when the wire rope W is manufactured, and it is determined by application of plastic deformation or a magnetic change, for example, when the wire rope W is handled.

A method for determining the defect of the wire rope W by the controller 21 is now described. When there is a disconnection or rust in a local portion of the wire rope W, the magnetic flux that passes through the receiving coils 11 and 12 of the differential coil 10 changes. The differential signal output from the differential coil 10 is a signal of the difference between the receiving coils 11 and 12, and thus the difference appears as a signal. The controller 21 detects this signal and detects a sudden change in the magnetic permeability of the wire rope W. Furthermore, the controller 21 detects a sudden structural change in the wire rope W based on the sudden change in the magnetic permeability of the wire rope W.

(Wire Rope Inspection Method)

Figure 6:
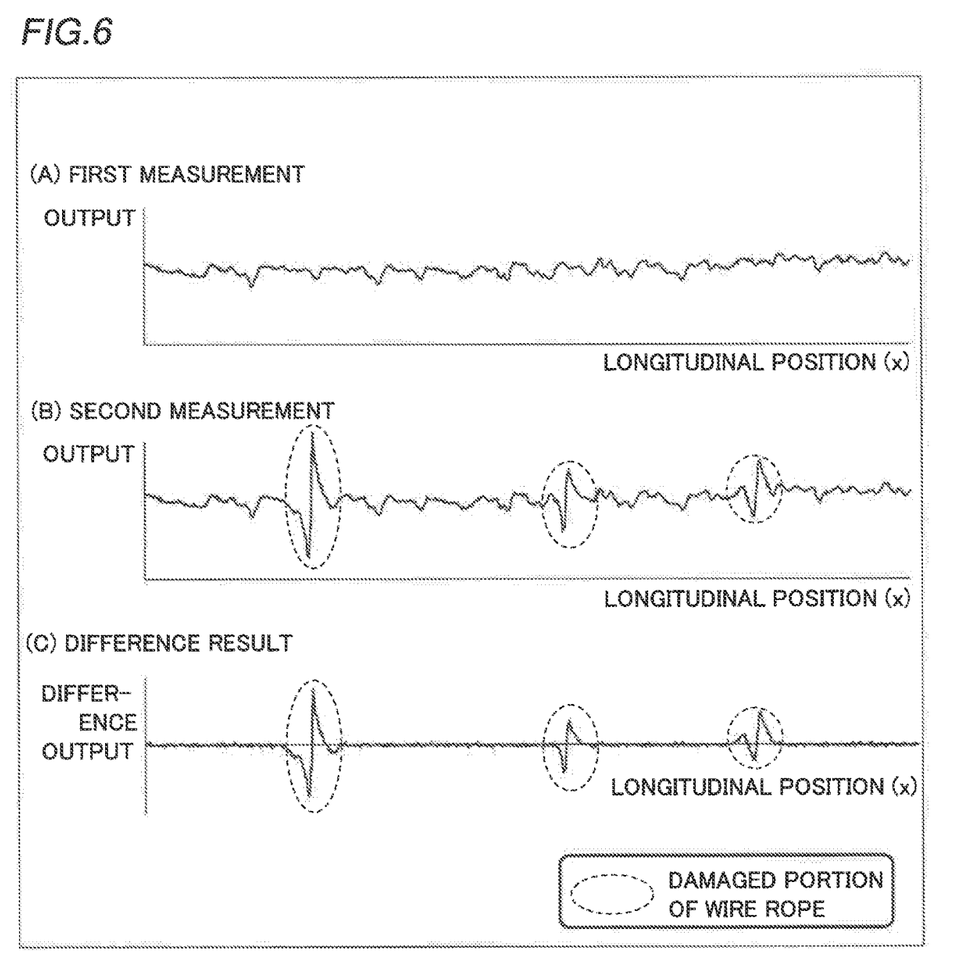
FIG. 6 is a diagram showing the output waveforms of a first detection signal and a second detection signal, both of which are acquired by the wire rope inspection device according to the first embodiment, and the output waveform of a difference between the first detection signal and the second detection signal.

A method for inspecting the wire rope W is now described with reference to FIGS. 6(A) to 6(C). The method for inspecting the wire rope W mainly includes three steps (a first step, a second step, and a third step). Hereinafter, description is made in order.

<About First Step>

The method for inspecting the wire rope W includes the first step of detecting a change in the magnetic field of the wire rope W by the differential coil 10 and performing the first measurement for acquiring the first detection signal. The first measurement may be performed before or after the wire rope W is started to be used in the elevator E. By the first step, an output waveform as shown in FIG. 6(A) is obtained.

<About Second Step>

The method for inspecting the wire rope W includes the second step of detecting a change in the magnetic field of the wire rope W by the differential coil 10 and performing the second measurement for acquiring the second detection signal after the first measurement. Note that a period between the first measurement and the second measurement is preferably set to a predetermined period (several months, for example) such that it is possible to confirm the progress of the damage of the wire rope W, instead of a relatively long period (several decades, for example) in which the wire rope W is cut, for example. In the second measurement, measurement (inspection) of the wire rope W is performed under the same conditions as those of the first measurement. For example, in the second measurement, the wire rope W is moved with respect to the wire rope inspection device 100 at the same speed as that of the first measurement. In the second measurement, the measurement (inspection) is started from the same position of the wire rope W as that of the first measurement, and the measurement (inspection) is completed at the same position of the wire rope W as that of the first measurement. By the second step, an output waveform as shown in FIG. 6(B) is obtained.

From the output waveform of FIG. 6(B), it can be seen that the wire rope W has three damaged portions. That is, it can be seen that the wire rope W has been damaged at three locations after the first measurement and before the second measurement. In addition, from the output waveform of FIG. 6(B), it can be seen that the outputs of portions other than the damaged portions are substantially the same as those in the output waveform shown in FIG. 6(A).

<About Third Step>

The method for inspecting the wire rope W includes the third step of detecting the state of the wire rope W based on the difference between the first detection signal and the second detection signal at substantially the same position. In the third step, the difference between the first detection signal and the second detection signal at substantially the same position is acquired, and an output based on a change in the intrinsic magnetic property of the wire rope W is canceled. By the third step, an output waveform as shown in FIG. 6(C) is obtained.

When the output waveform of FIG. 6(C) is compared with the output waveform of FIG. 6(B), it can be seen that the amount of change in the outputs of the damaged portions of the wire rope W is relatively larger, and the amount of change in the outputs of the non-damaged portions is relatively smaller. That is, in the output waveform of FIG. 6(C), the output is made such that the damaged portions and the non-damaged portions of the wire rope can be more clearly distinguished than in the output waveform of FIG. 6(B).

Advantages of First Embodiment

According to the first embodiment, the following advantages are obtained.

According to the first embodiment, as described above, based on the difference at substantially the same position between the first detection signal obtained by the first measurement and the second detection signal obtained by the second measurement in which substantially the same output as that in the first measurement is obtained, except for the outputs of the damaged portions of the wire rope W generated after the first measurement, the noise data of the wire rope W can be canceled, and thus it is possible to detect the damage of the wire rope W generated after the first measurement without being affected by the noise data (a change in the intrinsic magnetic property) of the wire rope W. Consequently, in the output waveform based on the detection signal, the output is made sharp such that the damaged portions and the non-damaged portions of the wire rope W can be more clearly distinguished, and thus the damage of the wire rope W can be detected accurately. That is, due to the difference, the amount of change in the outputs of the damaged portions of the wire rope W can be relatively increased, and the amount of change in the outputs of the non-damaged portions can be relatively reduced in the output waveform, and thus the damage of the wire rope W can be detected accurately.

According to the first embodiment, as described above, the differential coil 10 is configured to detect a change in the intrinsic magnetic property of the wire rope W, and the controller 21 is configured or programmed to acquire the difference between the first detection signal and the second detection signal at substantially the same position, and cancel the output based on the change in the intrinsic magnetic property of the wire rope W. Accordingly, the output based on the change in the intrinsic magnetic property of the wire rope W is canceled such that the damage of the wire rope W can be accurately detected.

According to the first embodiment, as described above, the wire rope inspection device 100 further includes the magnetic field application unit 4 configured to adjust the direction of the magnetization of the wire rope W by applying a magnetic field to the wire rope W in the direction that intersects with the direction in which the wire rope W extends. Accordingly, a magnetic field is applied to the wire rope W in advance by the magnetic field application unit 4 such that the magnetization of a portion of the wire rope W without any damage or the like can be adjusted, and thus the reproducibility of the output for each measurement by the wire rope inspection device 100 can be further improved. Consequently, a change in the intrinsic magnetic property of the wire rope W can be more reliably canceled based on the difference. That is, the influence of the noise data can be further reduced, and the damage of the wire rope W can be detected.

According to the first embodiment, as described above, the wire rope inspection device 100 further includes the storage 23 configured to store the detection information in which each of the first detection signal and the second detection signal is associated with the positional information of the wire rope W, and the controller 21 is configured or programmed to acquire the detection information from the storage 23, to substantially align, with each other, the positions at which the wire rope W is detected in the first measurement and the second measurement, and to acquire the difference between the first detection signal and the second detection signal. Accordingly, with the storage 23 configured to store the detection information, the difference between the first detection signal and the second detection signal at substantially the same position can be easily acquired.

According to the first embodiment, as described above, the controller 21 is configured or programmed to perform at least one of the correction of the sensitivity of the differential coil 10 and the correction of the position at which the wire rope W is detected with respect to the first detection signal or the second detection signal, and then acquire the difference between the first detection signal and the second detection signal. Accordingly, even when the first measurement and the second measurement are performed in different temperature environments, for example, the sensitivity range of the differential coil 10 at the time of the first measurement can be matched with the sensitivity range of the differential coil 10 at the time of the second measurement by the sensitivity correction. Therefore, the amount of change in the output acquired based on the difference between the first detection signal and the second detection signal can be further reduced. In addition, even when the first measurement and the second measurement are performed at positions in the wire rope W deviated from each other, the influence of the positional deviation can be significantly reduced or prevented by the position correction. Therefore, the amount of change in the output acquired based on the difference between the first detection signal and the second detection signal can be further reduced. Thus, the damage of the wire rope W can be more accurately detected.

Second Embodiment

The configuration of a wire rope inspection system 200 according to a second embodiment is now described with reference to FIGS. 2 and 7. In the second embodiment, an example is described in which the wire rope inspection system 200 transmits detection signals from an inspection device 100a to an external device 300a, and the external device 300a detects the state of a wire rope W, unlike the first embodiment in which the controller 21 of the wire rope inspection device 100 detects the state of the wire rope W. The same configurations as those of the first embodiment are denoted by the same reference numerals in the figures, and description thereof is omitted. The external device 300a is an example of the "control device" in the claims.

Figure 7:
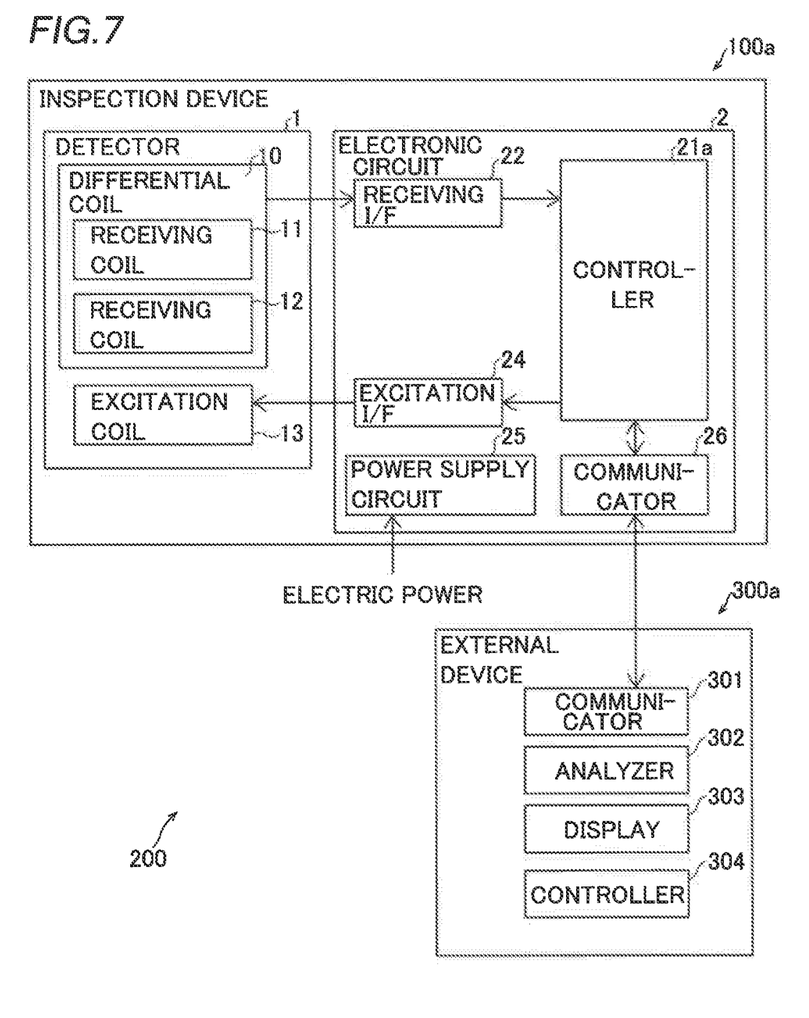
FIG. 7 is a block diagram showing the control configuration of a wire rope inspection system according to a second embodiment.

As shown in FIG. 7, the wire rope inspection system 200 according to the second embodiment includes the inspection device 100a and the external device 300a.

The inspection device 100a includes a differential coil 10, an excitation coil 13, a controller 21a, a receiving I/F 22, an excitation I/F 24, a power supply circuit 25, and a communicator 26. The controller 21a perform a control to transmit a first detection signal acquired by a first measurement and a second detection signal acquired by a second measurement to the external device 300a via the communicator 26.

The external device 300a includes a communicator 301, an analyzer 302, a display 303, and a controller 304. The controller 304 acquires the first detection signal and the second detection signal via the communicator 301. The controller 304 is configured to detect the state of the wire rope W (see FIG. 2) based on a difference between the first detection signal acquired by the first measurement in the inspection device 100a and the second detection signal acquired by the second measurement in the inspection device 100a at substantially the same position.

The remaining configurations of the second embodiment are similar to those of the aforementioned first embodiment.

Advantages of Second Embodiment

According to the second embodiment, the following advantages are obtained.

According to the second embodiment, similarly to the first embodiment, the noise data of the wire rope W is canceled such that the damage of the wire rope W can be accurately detected.

The remaining advantages of the second embodiment are similar to those of the aforementioned first embodiment.

Modified Examples

The embodiments disclosed this time must be considered as illustrative in all points and not restrictive. The scope of the present invention is not shown by the above description of the embodiments but by the scope of claims for patent, and all modifications (modified examples) within the meaning and scope equivalent to the scope of claims for patent are further included.

For example, while the example in which the wire rope is used in an elevator has been shown in each of the aforementioned first and second embodiments, the present invention is not limited to this. In the present invention, the wire rope may be used in a configuration other than an elevator, such as a crane, a suspension bridge, or a robot.

While the example in which the wire rope inspection device includes the magnetic field application unit has been shown in each of the aforementioned first and second embodiments, the present invention is not limited to this. In the present invention, the wire rope inspection device may not include the magnetic field application unit.

While the example in which the controller acquires the difference between the first detection signal and the second detection signal after performing the sensitivity correction has been shown in each of the aforementioned first and second embodiments, the present invention is not limited to this. In the present invention, the sensitivity correction may not be performed by the controller.

While the example in which the controller acquires the difference between the first detection signal and the second detection signal after performing the position correction has been shown in each of the aforementioned first and second embodiments, the present invention is not limited to this. In the present invention, the position correction may not be performed by the controller.

While the example in which the wire rope inspection device is connected to the external device has been shown in the aforementioned first embodiment, the present invention is not limited to this. In the present invention, the wire rope inspection device may be used independently without being connected to the external device.

While the example in which the wire rope is inspected by moving the wire rope with respect to the fixed (non-moving) wire rope inspection device (inspection device) has been shown in each of the aforementioned first and second embodiments, the present invention is not limited to this. In the present invention, the wire rope may be inspected by moving the wire rope inspection device (inspection device) with respect to the fixed (non-moving) wire rope.

DESCRIPTION OF REFERENCE NUMERALS

4: magnetic field application unit
10: differential coil (detection coil)

21, 304: controller
23: storage
100: wire rope inspection device
100a: inspection device
200: wire rope inspection system
300a: external device (control device)
W: wire rope

The invention claimed is:

1. A wire rope inspection device comprising:
a magnetic field application unit configured to adjust a magnitude and a direction of magnetization of a wire rope, which is a magnetic body, by applying a magnetic field to the wire rope in advance;
a detection coil including a first receiving coil and a second receiving coil, the detection coil being configured to detect a change in the magnetic field of the wire rope based on a difference between a detection voltage that changes with a magnetic flux that passes through the first receiving coil and a detection voltage that changes with a magnetic flux that passes through the second receiving coil; and
a controller configured or programmed to detect a state of the wire rope based on a difference at substantially a same position between a first detection signal acquired by the first receiving coil and the second receiving coil of the detection coil in a first measurement and a second detection signal acquired by the first receiving coil and the second receiving coil of the detection coil in a second measurement after the first measurement.

2. The wire rope inspection device according to claim 1, wherein
the detection coil is configured to detect a change in an intrinsic magnetic property of the wire rope; and
the controller is configured or programmed to acquire the difference between the first detection signal and the second detection signal at substantially the same position, and cancel an output based on the change in the intrinsic magnetic property of the wire rope.

3. The wire rope inspection device according to claim 1, wherein
the magnetic field application unit configured to adjust a direction of magnetization of the wire rope by applying the magnetic field to the wire rope in a direction that intersects with a direction in which the wire rope extends.

4. The wire rope inspection device according to claim 1, further comprising a storage configured to store detection information in which each of the first detection signal and the second detection signal is associated with positional information of the wire rope; wherein
the controller is configured or programmed to acquire the detection information from the storage, to substantially align, with each other, positions at which the wire rope is detected in the first measurement and the second measurement, and to acquire the difference between the first detection signal and the second detection signal.

5. The wire rope inspection device according to claim 1, wherein the controller is configured or programmed to perform at least one of a correction of a sensitivity of the detection coil and a correction of a position at which the wire rope is detected with respect to the first detection signal or the second detection signal, and then acquire the difference between the first detection signal and the second detection signal.

6. A wire rope inspection system comprising:
an inspection device including a magnetic field application unit configured to adjust a magnitude and a direction of magnetization of a wire rope, which is a magnetic body, by applying a magnetic field to the wire rope in advance, and a detection coil including a first receiving coil and a second receiving coil, the detection coil being configured to detect a change in the magnetic field of the wire rope based on a difference between a detection voltage that changes with a magnetic flux that passes through the first receiving coil and a detection voltage that changes with a magnetic flux that passes through the second receiving coil; and
a control device configured or programmed to detect a state of the wire rope based on a difference at substantially a same position between a first detection signal acquired by the first receiving coil and the second receiving coil of the detection coil in a first measurement and a second detection signal acquired by the first receiving coil and the second receiving coil of the detection coil in a second measurement after the first measurement.

7. The wire rope inspection system according to claim 6, wherein
the inspection device is configured to detect a change in an intrinsic magnetic property of the wire rope by the detection coil; and
the control device is configured or programmed to acquire the difference between the first detection signal and the second detection signal at substantially the same position, and cancel an output based on the change in the intrinsic magnetic property of the wire rope.

8. A wire rope inspection method comprising:
adjusting a magnitude and a direction of magnetization of a wire rope, which is a magnetic body, by applying a magnetic field to the wire rope in advance by a magnetic field application unit;
performing a first measurement for detecting a change in the magnetic field of the wire rope based on a difference between a detection voltage that changes with a magnetic flux that passes through a first receiving coil and a detection voltage that changes with a magnetic flux that passes through a second receiving coil and acquiring a first detection signal by a detection coil including the first receiving coil and the second receiving coil;
performing a second measurement for detecting the change in the magnetic field of the wire rope based on the difference between the detection voltage that changes with the magnetic flux that passes through the first receiving coil and the detection voltage that changes with the magnetic flux that passes through the second receiving coil and acquiring a second detection signal by the detection coil after the first measurement; and
detecting a state of the wire rope based on a difference between the first detection signal and the second detection signal at substantially a same position.

9. The wire rope inspection method according to claim 8, wherein the detecting the state of the wire rope includes acquiring the difference between the first detection signal and the second detection signal at substantially the same position, and canceling an output based on a change in an intrinsic magnetic property of the wire rope.

* * * * *